June 18, 1968 R. H. COLE 3,389,377

CONTENT ADDRESSABLE MEMORIES

Filed July 6, 1965 2 Sheets-Sheet 1

INVENTOR
ROBERT H. COLE
BY Arthur Freilich
ATTORNEY

CONTENT ADDRESSABLE MEMORIES

Filed July 6, 1965 2 Sheets-Sheet 2

Fig. 2

| | SEARCH BIT | STORED BIT | MISMATCH SIGNAL | GENERATE INHIBIT PULSE |
|---|---|---|---|---|
| EQUAL TO OR GREATER THAN | 0 | 0 | | √ |
| | | 1 | √ | √ |
| | 1 | 0 | √ | |
| | | 1 | | |
| EQUAL TO OR LESS THAN | 0 | 0 | | |
| | | 1 | | |
| | 1 | 0 | √ | √ |
| | | 1 | √ | √ |
| EQUAL TO | 0 | 0 | | |
| | | 1 | √ | |
| | 1 | 0 | √ | |
| | | 1 | | |

Fig. 3

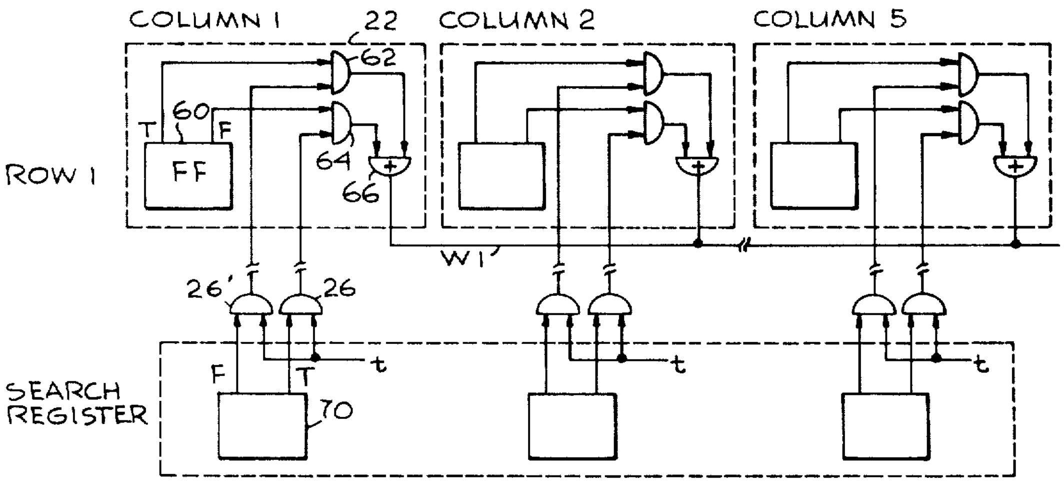

| (1) CRITERIA | (2) SEARCH | (3) SEARCH STORED WORD | (4) SS | (5) MS | (6) MS |
|---|---|---|---|---|---|
| ≠ EQUALS =' | = | = | M | M | MM |
| | | ≠ | MM | MM | M |
| < EQUALS ≥' | ≤ | = | M | M | MM |
| | | > | MM | MM | MM |
| | | < | MM | M | M |
| > EQUALS ≤' | ≥ | = | M | M | MM |
| | | > | MM | M | M |
| | | < | MM | MM | MM |

Fig. 4

INVENTOR
ROBERT H. COLE
BY Arthur Freilich

ATTORNEY

United States Patent Office 3,389,377

Patented June 18, 1968

3,389,377
CONTENT ADDRESSABLE MEMORIES

Robert H. Cole, Canoga Park, Los Angeles, Calif., assignor to The Bunker-Ramo Corporation, Stamford, Conn., a corporation of Delaware Filed July 6, 1965, Ser. No. 469,755
10 Claims. (Cl. 340—172.5)

ABSTRACT OF THE DISCLOSURE

A content addressable memory for yielding search results based on criteria excluding "exact matches" such as "nonexact match," "less than," "greater than." In order to search for those stored words which have a magnitude "less than" a search word, for example, a search is initially performed to isolate those words which are "less than or equal to" the search word. From the set of match indications thus developed, a subset corresponding to exactly matching words is removed by modifying the original search word and performing a subsequent "exact match" search to thus generate mismatch signals with respect to all of the stored words exactly matching the original search word. The invention herein described was made in the course of or under a contract or subcontract thereunder, with Bureau of Ships.

This invention relates generally to digital memories and more particularly to improvements in content addressable memories.

U.S. Patent No. 3,031,650 discloses some basic content addressable memory implementations and discusses the characteristics which distinguish such memories from conventional digital memories. Briefly, the significant distinguishing characteristic is that each word locaton in a content addressable memory is not uniquely identified by an address as in conventional digital memories but instead content addressable memory locations are selected on the basis of information stored therein; i.e. the contents thereof. Hence, the name content addressable memory.

As a result of selecting locations on the basis of stored information, memory search times can be considerably reduced at the cost of some additional hardware. That is, in situations where it is desired to select those locations, out of N locations in memory, storing words matching the search word, information identifying those locations can be derived in one memory access period instead of the N such periods required by conventional digital memories. More particularly, whereas it is necessary in a conventional digital memory to sequentially access the contents of each location and compare each accessed word with a search word, comparison of the search word with all of the stored words can be simultaneously effected in a content addressable memory.

Essentially, a content addressable memory operates by causing a signal representative of a search word bit to be applied simultaneously to all memory elements storing bits of corresponding significance. Some type of logic means is provided in the memory, such means being operable to generate signals to indicate whether the bits stored in the various memory elements are the same as or different from the corresponding search bit being sought. All elements of a single memory word location are coupled to a common word sense line and by sensing resultant signals appearing on the word sense line, a determination is made as to whether or not the word stored in the memory location associated with the word sense line matches or mismatches the search word.

Whereas the content addressable memory embodiment disclosed in the aforementioned U.S. Patent No. 3,031,650 performs a search which considers all stored bits in parallel, as well as all stored words, U.S. patent application Ser. No. 269,009 (now Patent No. 3,297,995), filed Mar. 29, 1963 by Ralph J. Koerner and Alfred D. Scarbrough and assigned to the same assignee as the present application, discloses a content addressable memory embodiment which causes the bits of stored words to be considered serially or sequentially, while the words are still considered in a parallel fashion. Further, whereas the content addressable memory disclosed in the cited U.S. Patent No. 3,031,650 does not specifically discuss the utilization of any search criteria other than "exact match," the cited patent application discloses apparatus which permits other search criteria to be specified. Thus, each stored word can be compared with the search word to determine whether it exactly matches or is "greater than or equal to" or "less than or equal to" the search word. By incorporating the ability to simultaneously compare a search word with a plurality of stored words in accordance with these different criteria, an exceedingly useful content addressable memory system is provided.

In addition to the three above stated criteria, it is often desirable to perform searches based on other criteria, particularly, "nonexact match," "less than" and "greater than." It can be recognized that these criteria would yield results which are respectively the complements of results yielded by searches based on "exact match," "greater than or equal to," and "less than or equal to." That is, any stored word will of course meet the "less than" criteria if it fails to satisfy the "greater than or equal to" criteria. Accordingly, in order to employ the "less than" criteria, a "greater than or equal to" search could be performed and the resulting match indications could be complemented. Similarly, the match indications resulting from a "less than or equal to" search can be complemented to find the stored words which are "greater than" the search word. Although additional hardware can be provided in the sensing devices associated with each memory word sense line in order to complement the match indications resulting from a search, such hardware would be relatively expensive because of the great number of words which are usually employed in memories of this type.

In accordance with the present invention, a content addressable memory capable of performing "nonexact," "less than," and "greater than" searches is provided which requires very little modification of previous memories not having these capabilities.

More particularly, in the aforecited patent application, a different sensing device is coupled to each word sense line, each such sensing device including first and second binary elements which will be respectively referred to as sense store and match store elements. Each sense store element functions to sense and store the appearance of the initial mismatch signal on the word sense line to which it is coupled and thus the sense store elements taken as a group provide a set of indications indicating those words which exactly match the search word. A gate couples each sense store element to a match store element such that when the sense store element switches to a mismatch state, it causes the match store element to also switch to a mismatch state unless the gate is inhibited. In performing an "exact match" search, the gate is never inhibited. In performing a "greater than or equal" search the gate is inhibited whenever the active search bit is a "0" because if it causes a mismatch signal to be generated, it means of course that the corresponding stored bit is a "1" and thus matches the "greater than or equal to" criteria meaning therefore that the corresponding match store element should not be switched to a mismatch state. Similarly, when a "less than or equal to" search is performed, the gates should be inhibited whenever the active search bit is "1." Thus, the match store elements taken as a group provide a set of indications indicating those words which match the search word in accordance with a defined criterion and includes first and second subsets of indications respectively corresponding to those words which exactly match the search word and those words which match some other criteria, e.g. "less than" or "greater than."

Briefly, the present invention is based upon the recognition that a set of indications corresponding to exactly matching words can be employed to remove corresponding indications from a set comprised of first and second subsets respectively corresponding to those words which exactly match the search word and those words which match some other criteria. Thus, exactly matching words can be removed from the set comprised of words which are "greater than or equal to" (to leave in the set only those words which are in fact "greater than" the search word) by forcing a mismatch signal into each sense store element in a match state to thus switch all of the corresponding match store elements to a mismatch state. Accordingly, thereafter all of the match store elements containing match indications will indicate words which are "greater than" the search word. Similarly, exactly matching words can be removed from a set of words matching the "less than or equal to" criteria, to thus leave words which are in fact "less than" the search word. Also, "nonexact" match indications can be developed by resetting all of the match store elements after an "exact match" search and then forcing mismatch signals into the sense store elements in a match state to thereby switch all of the match store elements associated with exactly matching words to a mismatch state.

One of the features of the invention involves the technique employed to force a mismatch signal into the sense store elements in a match state. This technique involves switching one of the bits in the original search word and then interrogating the corresponding stored bits again. As a consequence, mismatch signals will be provided on the word sense lines of all of those words which originally exactly matched the search word.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIG. 2 is a table illustrating how the memory of FIG. 1 can be operated to employ "greater than or equal to," "less than or equal to," and "exact match" search criteria;

FIG. 3 is a block diagram illustrating an exemplary type of content addressable memory cell; and FIG. 4 is a table illustrating how the memory can be operated to employ "greater than," "less than," and "nonexact match" search criteria.

Figure 1:
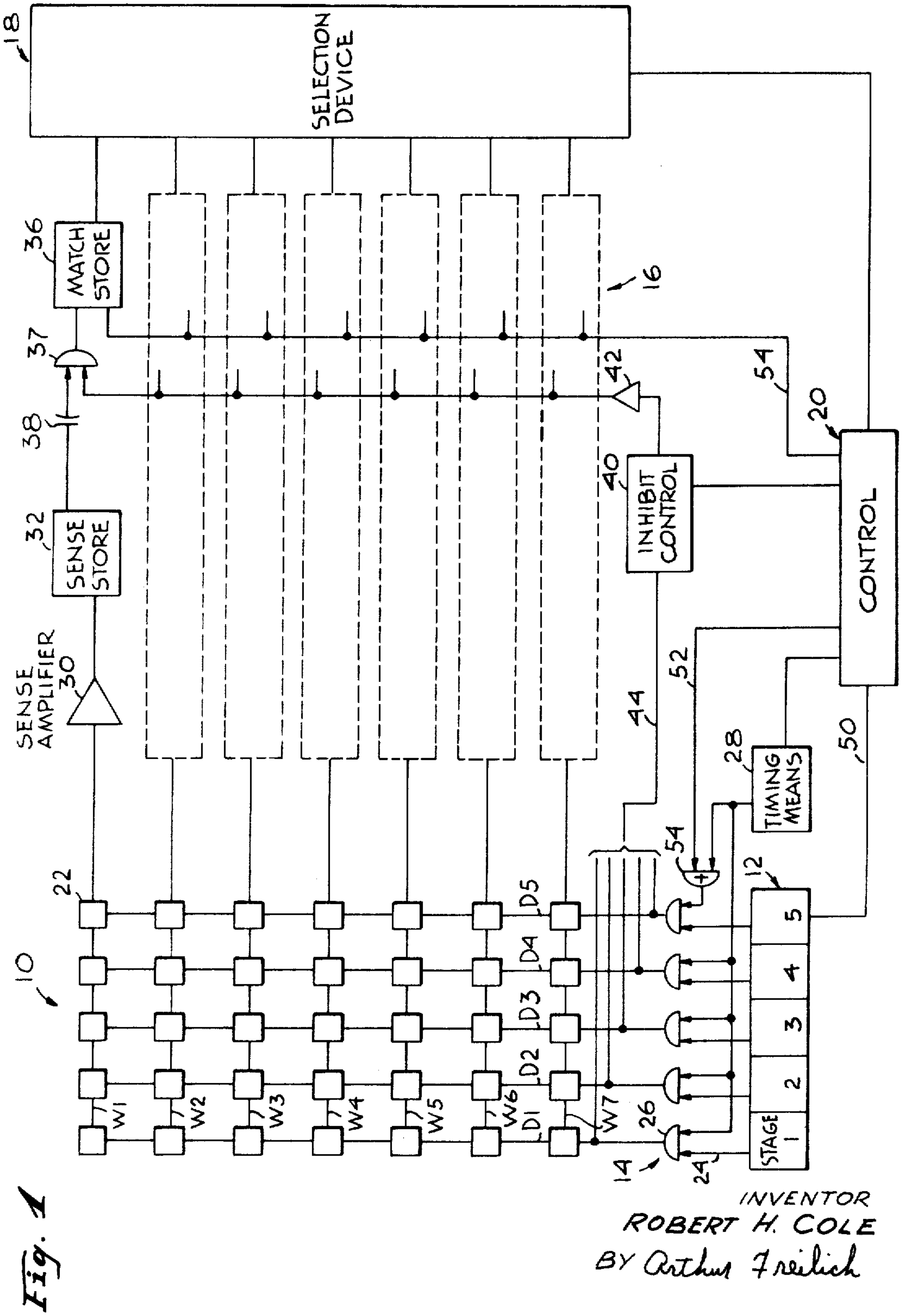
FIGURE 1 is a block diagram of a content addressable memory system employing the teachings of the present invention.

Attenuation is now called to FIG. 1 which illustrates a content addressable memory constructed in accordance with the present invention and including a memory matrix 10, a search register 12, interconnecting circuit means 14, a plurality of sensing devices 16, a selection device 18, and a control apparatus 20 which exercises control over all of the aforementioned elements.

The exemplary memory matrix 10 includes N (herein, seven) rows of of memory elements, each row comprised of Q (herein, five) memory elements. Each of the memory elements 22 constitutes a bistable storage device enabling it to assume first and second states respectively representative of binary digits or bits, namely "0" and "1." In addition, each of the memory elements 22 has certain logical properties which enable it to compare its stored bit with one of the bits stored in the search register 12. Each of the matrix rows can appropriately be referred to as a memory location, each location being capable of storing a bit pattern constituting a single word. Although the exemplary memory illustrated herein makes use of a five bit word length, it is pointed out that a memory of any arbitrary word length and of any arbitrary word capacity can be constructed in accordance with the invention.

Each of the matrix columns consists of a plurality of memory elements, each of which serves to store information of corresponding significance in a different memory location. That is, words may in fact represent numerical quantities and it is common practice to place bits of corresponding significance in such words in correspondingly positioned memory elements. For example, binary information can be stored in the elements of the memory matrix such that the elements in column 1 of the matrix respectively store the most significant bit of each stored word and the elements of columns 2 through 5 of the matrix respectively store bits of decreasing significance.

A digit line D1 is associated with all of the memory elements 22 of column 1 of the matrix. Similarly, digit lines D2, D3, D4, and D5 are each correspondingly associated with all of the memory elements of columns 2, 3, 4, and 5 of the matrix respectively. On the other hand, a word line W1 is associated with all of the memory elements in row 1 of the matrix. Similarly, word lines W2, W3, W4, W5, W6, and W7 are correspondingly associated with memory elements of rows 2 through 7 of the matrix.

The search register 12 is comprised of a plurality of binary storage stages equal in number to the number of matrix columns. Each of the search register stages is provided with an output terminal 24 which is coupled to the input of a gating means 26. The output of each gating means 26 is connected to a corresponding one of the digit lines. When a gating means 26 is enabled, it provides a binary signal on the digit line connected thereto representative of the state of the search register stage also coupled thereto. As previously mentioned, each of the memory elements 22 has certain logic capabilities. These capabilities permit it to compare the state of the search register stage with its own stored state and provide an output or mismatch signal in the event the states do not match. The logical function performable by each memory element 22 can therefore be described by the following logical equation:

$$\text{Mismatch signal} = A \cdot \overline{B} + \overline{A} \cdot B \qquad (1)$$

where A represents the state of a search bit and B represents the state of the memory element. A mismatch signal developed by a memory element 22 will appear on the word line coupled thereto.

Thus, in order to perform a search to determine whether a search word stored in the register 12 is equal to any of the words stored in the matrix 10, corresponding bits can be compared and the word lines can be monitored to see whether any mismatch signals appear thereon. If no mismatch signal appears on a particular word line after all of the bits have been compared, then it is clear that the word stored in the location associated with that word line exactly matches the search word. Where it is only desired to determine whether a search word exactly matches a stored word, all of the bits can be considered simultaneously. However, where it is, in addition, desired to compare the magnitude of each stored word relative to the search word, it is usually more convenient to consider the bits sequentially in order of decreasing significance. Thus, a timing means 28 is provided whose output is coupled to the gating means 26. In performing a search, the timing means 28 will enable the gating means 26 in sequence such that the most significant search word bit is initially compared with all of the most significant stored word bits. The remaining bits are then compared in order of decreasing significance down to the least significant bit.

It has been pointed out (e.g. the aforecited patent application) that if bits of a search word and a stored word are compared in sequence, a determination can be made as to whether the stored word is "greater than or equal to" or "less than or equal to" the search word. That is, if the initial mismatch signal appearing on a word line is developed when a search bit "1" is being compared, then the correspondingly significant stored bit must be a "0" and therefore the stored word must be less than the search word. If on the other hand the initial mismatch signal on a word line is developed when a "0" search bit is being compared, then the correspondingly significant stored bit must be a "1" and the stored word will of course be greater than the search word. As previously noted, if no mismatch signals appear on a word line, then the stored word is equal to the search word.

A different sensing device 16 is connected to each of the word lines. Each sensing device 16 includes a sense amplifier 30 and a sense store binary element, e.g. a flip-flop 32. In response to the initial mismatch signal appearing on a word line, the sense amplifier 30 will provide a signal to the sense store element 32 to switch it to a mismatch state. Thus, the sense store element will indicate whether or not a stored word exactly matches the search word. As noted, it is also desirable to be able to determine whether a stored word is "greater than or equal to" or "less than or equal to" the search word. Thus, let it be assumed that a word stored in location 1 is in fact less than the search word stored in register 12 and a "less than or equal to" criterion is defined. In the course of sequentially comparing correspondingly significant bits, at least one mismatch signal will appear on word line W1 which would switch the sense store element 32 to a mismatch state. However, since the word stored in location 1 would actually match the search word within the stated criteria, it is necessary to provide an additional set of match indications which indicates that although the word does not exactly match the search word, it does match it within the defined criteria. For this purpose, a match store element 36, e.g. also a flip-flop, is provided whose input is coupled via a capacitor 38 and a gate 37 to the output of the sense store element 32. When the sense store element 32 switches to a mismatch state, the capacitor 38 provides a signal indicating that transition to the input of gate 37. If gate 37 is not inhibited by a signal provided by an inhibit control means 40 through an inverter 42, the match store element will also switch to a mismatch state. If gate 37 is inhibited, the match store element will not be switched to a mismatch state. The table of FIG. 2 summarizes the operation of the memory indicating when inhibit pulses should be generated by the inhibit control means 40. It can be seen that when it is merely desired to determine whether the stored words are equal to the search word, no inhibit pulses need be generated and whenever a bit of a stored word differs from a corresponding bit of the search word, a mismatch signal will appear on the word line associated therewith. Whenever the "less than or equal to" criterion is defined by the control means 20, the inhibit control means 40 will generate an inhibit pulse whenever the search bit (which the inhibit control means 40 senses on its input line 44) is a "1." On the other hand, when a "greater than or equal to" criterion is defined, an inhibit pulse is generated whenever the search bit is a "0."

In order to better illustrate the operation of the system thus far described, Table I set forth below illustrates arbitarily defined words stored in each of the seven memory matrix locations and an arbitrarily defined search word. The state of each sense store element at the completion of a search is indicated. In addition, the state of each match store element for each of the three different searches is also indicated.

TABLE I

| | | | | | Sense Store | | Match Store | |
|---|---|---|---|---|---|---|---|---|
| | | | | | | = | ≤ | ≥ |
| 0 | 0 | 0 | 0 | 0 | MM | MM | M | MM |
| 0 | 0 | 1 | 0 | 1 | MM | MM | M | MM |
| 0 | 1 | 1 | 1 | 0 | MM | MM | MM | M |
| 1 | 1 | 1 | 1 | 1 | MM | MM | MM | M |
| 1 | 0 | 0 | 0 | 0 | MM | MM | MM | M |
| 0 | 0 | 1 | 1 | 0 | M | M | M | M |
| 1 | 1 | 0 | 0 | 1 | MM | MM | MM | M |
| 0 | 0 | 1 | 1 | 0 | | | | |

From Table I, it will be noted that the sense store elements as a group provide a set of indications which indicate those words exactly matching the search word. The match store elements on the other hand provide a set of match indications including two subsets; namely a subset comprised of those words exactly matching the search word and a subset comprised of words which match some different criterion, e.g. "less than." In accordance with the present invention, means are provided for removing from the match indications, the subset corresponding to those words which exactly match the search word so that only words which are in fact "less than" the search word will be thereafter indicated as matching. Similarly of course, the present invention enables match indications to be provided corresponding to only those words which in fact are "greater than" the search word.

Briefly, in accordance with the present invention, after all of the search word bits have been compared with stored bits corresponding thereto, the match indications defined by the sense store elements 32 are employed to remove the corresponding match indications from those defined by the match store elements. In order to do this, each of the sense store elements 32 defining a match state is switched to a mismatch state and no inhibit signal is provided thereby switching the corresponding match store elements to a mismatch state.

In the preferred embodiment of the invention, the sense store elements 32 which remain in a match state after all of the search register bits have been compared with the corresponding stored bits, are switched to a mismatch state by changing at least one of the search word bits and then comparing the changed search word bit with all of the correspondingly signicant stored bits. This comparison will of course result in a mismatch signal being provided on each word line which had not previously had a mismatch signal provided thereon. Consequently, all of the sense store elements defining a match state will therefore switch to a mismatch state.

FIG. 1 illustrates a conductor 50 coupling the control means 20 to state 5 of the search register. By applying an appropriate signal to line 50, the control means 20 can complement the bit stored in state 5 of the register. Subsequently, the control means 20, via conductor 52 applied to OR gate 54 whose output enables the gate means 26 associated with stage 5, causes a binary interrogation signal to be applied to digit line 5. Consequently, all of the sense store elements defining a mach state will switch to a mismatch state.

Thus far, operation of the apparatus of FIG. 1 has been discussed for developing match indications in the match store elements 36 corresponding to "less than" and "greater than" criteria. These two criteria respectively represent the complements of "greater than or equal to" and "less than or equal to." The apparatus of FIG. 1 can also be operated to provide the complement of match indications resulting from an "exact match" search. That is, "inexact match" indications can be developed. This is accomplished by initially performing an "exact match" search so that the match store elements storing match indications after the search will indicate those words which exactly match the search word. The control means 20 can thereafter reset all of the match store elements 36 to a match state via conductor 54. Then, mismatch signals can be provided on all of the word lines connected to sense store elements 32 which have remained in a match state. These mismatch signals can be provided on the word lines in the same manner as indicated in connection with the "less than" and "greater than" operations. As a consequence, mismatch signals will be provided to those match store elements 36 which previously were in the match state while no mismatch signals will be provided to match store elements 36 previously in the mismatch state.

FIG. 4 comprises a table summarizing the operation of the apparatus of FIG. 1 in accordance with the present invention. Various search criteria in accordance with the present invention are set forth in column 1 of the table of FIG. 4. Thus for example, in order to perform an "inexact" search which as indicated is equal to the complement of an "exact match" search, an "exact match" search must be initially performed as indicated by column 2. If the search word and stored word are equal as shown in column 3, then both the sense store and match store flip-flops (columns 4 and 5) will remain in match states. If the search and stored words are not equal, then both the sense store and match store flip-flops will switch to a mismatch state. After the search is completed, all the match store elements are switched to a match state. The subsequent provision of a mismatch signal from the sense store flip-flops previously in a match state complements the associated match store flip-flops switching them to mismatch states as indicated in column 6. The remainder of the table similarly summarizes the states of the various elements in respectively performing "less than" and "greater than" searches.

The exact construction of each memory element 22 can take several different forms, one of which is set forth in the aforecited patent application. A more straightforward, but probably more costly, form of memory element is shown in FIG. 3 wherein each element comprises a flip-flop 60 having true and false output terminals which are respectively connected to the input of AND gates 62 and 64. The outputs of AND gates 62 and 64 are connected to the input of an OR gate 66 whose output is coupled to the word line W1. Stage 1 of the search register is also represented as a flip-flop 70 having true and false output terminals which are respectively connected to AND gates 26 and 26'. The output of AND gate 26' is connected to the input of AND gate 62 while the output of AND gate 26 is connected to the input of AND gate 64. AND gates 26 and 26' are simultaneously enabled by timing means 28. In response to the AND gates 26 and 26' being enabled, if the flip-flop 70 is in a true state, then AND gate 26 will provide a true signal to AND gate 64. If the flip-flop 60 defines a false state, then AND gate 64 will provide an output or mismatch signal to OR gate 66 which will be applied to word line W1. If on the other hand flip-flop 70 defined a false state, then when the gates 26 and 26' were enabled, AND gate 26' would provide an enabling signal to AND gate 62 which, if the flip-flop 60 defined a true state, would in turn provide an output or mismatch signal through OR gate 66 to the word line W1. Thus, it should be appreciated with the gating illustrated in FIG. 3, an output signal will be provided on each word line whenever the bit stored in the search register flip-flop is different from the bit stored in the correspondingly significant memory element.

The selection device 18 shown in FIG. 1 can comprise a commutator which sequentially examines the states of the match store elements after a search and selects those elements in a match state for further processing.

From the foregoing, it should be appreciated that an apparatus and a method for operating that apparatus have been disclosed herein which enables a search word to be simultaneously compared with a plurality of stored words to determine whether each of those stored words is "less than," "greater than," or "unequal to" the search word. More broadly, the invention shown herein permits match indications developed as a consequence of an initial content addressable memory search to be complemented.

The embodiments of the invention in which an exclusive property or privilege is claimed are defined as follows:

1. Apparatus for comparing first and second words, each comprised of at least one binary digit to determine the relative magnitude of said words, said apparatus including:

means for sequentially comparing corresponding digits of said first and second words in order of significance and for providing a mismatch signal whenever compared digits do not match;

a sense store element capable of defining match and mismatch states;

means responsive to said mismatch signal for switching said sense store element to said mismatch state;

a match store element capable of defining match and mismatch states;

logic means dependent upon the state of said first word digits for selectively switching said match store element to said mismatch state in response to said mismatch signal; and means actuatable subsequent to all of said digits being compared for switching said match store element to a mismatch state in the event said sense store element defines a match state.

2. The apparatus of claim 1 wherein said last recited means includes means for modifying one digit in said first word and for comparing that digit with the corresponding digit in said second word.

3. Apparatus for comparing each of a plurality of multibit words with a multibit seach word to determine the magnitudes thereof relative to said search word, said apparatus comprising:

a memory matrix comprised of a plurality of locations, each storing one of said multibit words;

a plurality of word sense lines each associated with a different one of said locations;

each of said locations including a plurality of binary memory cells, each cell storing a different bit of one of said words;

a search register comprised of a plurality of binary storage cells each respectively storing a different search word bit;

means for sequentially comparing in order of decreasing significance the state of each of said storage cells with the states of all of the correspondingly significant memory cells and for providing a mismatch signal on the associated word sense line in the event said states do not match;

a plurality of sense store elements, each capable of defining match and mismatch states and each coupled to a different one of said word sense lines;

a plurality of match store elements, each capable of defining match and mismatch states and each coupled to a different one of said word sense lines;

means responsive to a mismatch signal appearing on a word sense line for switching the sense store element coupled thereto to a mismatch state;

means dependent on the search word bit being compared for selectively switching each match store element to a mismatch state in response to a mismatch signal appearing on the word sense line coupled thereto; and means actuatable subsequent to all of said bits being compared for switching all of said match store elements coupled to said sense store elements defining a match state to a mismatch state.

4. The apparatus of claim 3 wherein said last recited means includes means for modifying at least one bit in said search word and for comparing that bit with the corresponding bits in each of said stored words.

5. Apparatus for determining whether the magnitude of a first word is greater or less than the magnitude of a second word, each word comprised of at least one bit, said apparatus comprising:

means for sequentially comparing corresponding bits of said first and second words in order of decreasing significance and for providing a mismatch signal whenever compared bits differ;

a sense store element capable of defining match and mismatch states;

means responsive to the first provided mismatch signal for switching said sense store element to said mismatch state;

a match store element capable of defining match and mismatch states;

logic means responsive to the first word bit being compared defining a first state for switching said match store element to a mismatch state in response to said first provided mismatch signal; and means actuatable subsequent to all of said bits being compared for switching said match store element to a mismatch state in the event said sense store element defines a match state.

6. Apparatus for determining the relative magnitude of a first word as compared to a second word, each word comprised of at least one bit, said apparatus comprising:

means for sequentially comparing corresponding bits of said first and second words in order of decreasing significance and for providing a mismatch signal whenever compared bits differ;

a sense store element capable of defining match and mismatch states;

means responsive to the first provided mismatch signal for switching said sense store element to said mismatch state;

a match store element capable of defining match and mismatch states;

coupling means coupling said sense store element to said match store element and operative in response to said sense store element switching to a mismatch state for switching said match store element to a mismatch state;

means dependent upon the state of said first word bits being compared for selectively rendering said coupling means inoperative; and means actuatable subsequent to all of said bits being compared for switching said match store element to a mismatch state in the event said sense store element defines a match state.

7. The apparatus of claim 6 wherein said last recited means includes means for modifying one digit in said first word and for comparing that digit with the corresponding digit in said second word.

8. In a system including a memory having a plurality of locations each storing a multibit word and including means in each location for sequentially comparing each bit thereof with the search word bits of corresponding significance for providing a mismatch signal whenever compared bits differ and further including a plurality of first binary elements each associated with a different location and each responsive to a first mismatch signal for switching from a match to a mismatch state, the improvement comprising:

means defining a "less than" search criterion;

a plurality of second binary elements each associated with a different one of said first binary elements and each capable of defining match and mismatch states;

coupling means operable to switch each of said second binary elements to a mismatch state in response to the associated first binary element switching to a mismatch state;

means responsive to a search word bit equal to "0" being compared for inhibiting the operation of said coupling means; and means actuatable subsequent to all of said bits being compared for providing a mismatch signal to all of said first binary elements for switching any first binary elements defining a match state to a mismatch state.

9. In a system including a memory having a plurality of locations each storing a multibit word and including means in each location for sequentially comparing each bit thereof with the search word bits of corresponding significance for providing a mismatch signal whenever compared bits differ and further including a plurality of first binary elements each associated with a different location and each responsive to a first mismatch signal for switching from a match to a mismatch state, the improvements comprising:

means defining a "greater than" search criterion;

a plurality of second binary elements each associated with a different one of said first binary elements and each capable of defining match and mismatch states;

coupling means operable to switch each of said second binary elements to a mismatch state in response to the associated first binary element switching to a mismatch state;

means responsive to a search word bit equal to "1" being compared for inhibiting the operation of said coupling means; and means actuatable subsequent to all of said bits being compared for providing a mismatch signal to all of said first binary elements for switching any first binary elements defining a match state to a mismatch state.

10. In a system including a memory having a plurality of locations each storing a multibit word and including means in each location for sequentially comparing each bit thereof with the search word bits of corresponding significance for providing a mismatch signal whenever compared bits differ and further including a plurality of first binary elements each associated with a different location and each responsive to a first mismatch signal for switching from a match to a mismatch state, the improvement comprising:

means defining a "nonexact" search criterion;

a plurality of second binary elements each associated with a different one of said first binary elements and each capable of defining match and mismatch states;

coupling means operable to switch each of said second binary elements to a mismatch state in response to the associated first binary element switching to a mismatch state;

first means actuatable subsequent to all of said bits being compared for switching all of said second binary elements to a match state; and second means actuatable subsequent to said first means for providing a mismatch signal to all of said first binary elements for switching any first binary elements defining a match state to a mismatch state.

References Cited

UNITED STATES PATENTS

| | | | |
|---|---|---|---|
| 3,297,995 | 1/1967 | Koerner et al. ______ | 340—172.5 |
| 3,320,592 | 5/1967 | Rogers et al. ______ | 340—172.5 |
| 3,329,937 | 7/1967 | Lewim ____________ | 340—172.5 |
| 3,332,069 | 7/1967 | Joseph et al. ______ | 340—172.5 |

ROBERT C. BAILEY, *Primary Examiner.*

I. S. KAVRUKOV, *Assistant Examiner.*